United States Patent
Genkin et al.

(10) Patent No.: US 10,011,891 B2
(45) Date of Patent: Jul. 3, 2018

(54) METHODS FOR CONCENTRATING RARE-EARTH METALS IN PHOSPHOGYPSUM AND REMOVING THEREOF FROM WET PROCESS PHOSPHORIC ACID

(71) Applicant: OPENED JOINT STOCK COMPANY "UNITED CHEMICAL COMPANY URALCHEM", Moscow (RU)

(72) Inventors: Mikhail Vladimirovich Genkin, Moscow (RU); Aleksey Vladimirovich Evtushenko, Moscow (RU); Aleksey Aleksandrovich Komkov, Moscow (RU); Alfiya Minerovna Safiulina, Moscow (RU); Vasiliy Sergeevich Spiridonov, Moscow (RU); Sergey Vladimirovich Shvetsov, Nizhegorodskaya oblast (RU)

(73) Assignee: Open Joint-Stock Company "United Chemical Company Uralchem", Moscow (RU)

( * ) Notice: Subject to any disclaimer, the term of this patent is extended or adjusted under 35 U.S.C. 154(b) by 0 days.

(21) Appl. No.: 14/775,241

(22) PCT Filed: Nov. 8, 2013

(86) PCT No.: PCT/RU2013/000988
§ 371 (c)(1),
(2) Date: Sep. 11, 2015

(87) PCT Pub. No.: WO2014/148945
PCT Pub. Date: Sep. 25, 2014

(65) Prior Publication Data
US 2016/0032423 A1    Feb. 4, 2016

(30) Foreign Application Priority Data
Mar. 18, 2013  (RU) .................. 2013111926

(51) Int. Cl.
*C22B 59/00* (2006.01)
*C22B 3/08* (2006.01)

(52) U.S. Cl.
CPC ............ *C22B 59/00* (2013.01); *C22B 3/08* (2013.01); *Y02P 10/234* (2015.11)

(58) Field of Classification Search
None
See application file for complete search history.

(56) References Cited

U.S. PATENT DOCUMENTS

| | | | |
|---|---|---|---|
| 2,783,125 A | 2/1957 | De Rohden et al. |
| 3,647,361 A | 3/1972 | Colitrinari et al. |
| 4,169,880 A | 10/1979 | Cuer et al. |
| 5,030,424 A | 7/1991 | Fulford et al. |

FOREIGN PATENT DOCUMENTS

| | | |
|---|---|---|
| CN | 101597688 A | 12/2009 |
| CN | 101823750 A | 9/2010 |
| CN | 102876889 A | 1/2013 |
| EP | 0026132 A1 | 4/1981 |
| EP | 0026132 B1 | 8/1983 |
| EP | 0265547 A1 | 5/1988 |
| EP | 0522234 A1 | 1/1993 |
| JP | 70002832 B * | 10/1967 |
| KZ | 24267 A4 | 7/2011 |
| PL | 155815 | 6/1993 |
| RU | 2047562 C1 | 11/1995 |
| RU | 2118613 C1 | 9/1998 |
| RU | 2172719 C1 | 8/2001 |
| RU | 2225892 C1 | 3/2004 |
| RU | 2258036 C1 * | 8/2005 |
| RU | 2288171 C1 | 11/2006 |
| RU | 2293781 C1 | 2/2007 |
| RU | 2293134 C1 | 10/2007 |
| RU | 2349652 C2 | 3/2009 |
| RU | 2374260 C1 | 11/2009 |
| RU | 2381178 C1 | 2/2010 |
| RU | 2471011 C1 | 12/2012 |
| RU | 2528573 C1 | 9/2014 |
| RU | 2528576 C1 | 9/2014 |
| RU | 2538863 C2 | 1/2015 |
| RU | 2543160 C2 | 2/2015 |
| RU | 2546739 C2 | 4/2015 |
| SU | 862819 A1 | 9/1981 |
| SU | 950684 A1 | 8/1982 |
| SU | 1370076 A1 | 1/1988 |
| WO | 2006058508 A1 | 6/2006 |

OTHER PUBLICATIONS

Lokshin et al., A Study of the Solubility of Yttrium, Praseodymium, Neodymium, and Gadolinium Sulfates in the Presence of Sodium and Potassium in Sulfuric-Phosphoric Acid Solutions at 20C, Russian Journal of Applied Chemistry, vol. 80, No. 8, pp. 1275-1280 (Nov. 2007).*

(Continued)

*Primary Examiner* — Melissa S Swain
(74) *Attorney, Agent, or Firm* — Baker & McKenzie LLP

(57) ABSTRACT

The present invention relates to a method for producing rare-earth metals (REM) compounds by complex processing of apatite, in particularly to a method for concentrating rare-earth metals (REM) in phosphogypsum, where to a process of decomposition of the REM containing raw phosphate material with sulphuric acid, a sodium salt in the amount of 0.25-5.0 kg in terms of $Na_2O$ or a potassium salts in the amount of 0.25-5.0 kg in terms of $K_2O$ or a mixture thereof in the amount of 0.25-5 kg in terms of $Na_2O$ and $K_2O$ to 1 kg of REM (in terms of $Ln_2O_3$ present in raw phosphate material) is added. The yield of REM transfer into phosphogypsum is up to 98%.

2 Claims, No Drawings

(56) References Cited

OTHER PUBLICATIONS

International Search Report and Written Opinion of the International Searching Authority for co-pending PCT application No. PCT/RU2013/000990 dated May 15, 2014.
International Search Report and Written Opinion of the International Searching Authority for co-pending PCT application No. PCT/RU2013/000989 dated Apr. 3, 2014.
International Search Report and Written Opinion of the International Searching Authority for co-pending PCT application No. PCT/RU2013/000992 dated Apr. 10, 2014.
International Search Report and Written Opinion of the International Searching Authority for co-pending PCT application No. PCT/RU2013/000991 dated Apr. 10, 2014.
Office Action issued by the USPTO dated Jul. 1, 2016 for U.S. Appl. No. 14/773,716, 6 pages.
Office Action issued by the USPTO dated Jul. 11, 2016 for U.S. Appl. No. 14/773,725, 7 pages.
Koopman, Extraction of Lanthanides from the Phosphoric acid Production Process to gain a Purified Gypsum and a valuable Lanthanide by-product, Hydrometallurgy 58, 51-60 (Apr. 2000).
International search report and written opinion of the international searching authority for co-pending PCT application No. PCT/RU2013/000988 dated Mar. 13, 2014.
Decision to Grant a Patent for Invention dated Oct. 27, 2014 for RU Application No. 2013111926/02 filed Mar. 18, 2013, now RU Patent No. 2543160 C1.
Office Action (w/English translation) Issued by the Department for Substantive Examination dated Jun. 25, 2014 for RU Application No. 2013111926/02, 7 pages.
Extended European Search Report dated Dec. 8, 2016 in connection with European Appl. No. 13879034.0, 6 pages.
E.P. Lokshin, et al., "Recovery of Lanthanides from Extraction Phosphoric Acid Produced by the Dihydrate Process", pp. 951-957.

\* cited by examiner

METHODS FOR CONCENTRATING RARE-EARTH METALS IN PHOSPHOGYPSUM AND REMOVING THEREOF FROM WET PROCESS PHOSPHORIC ACID

CROSS REFERENCE TO RELATED APPLICATIONS

This patent application is a national phase filing under section 371 of PCT/RU2013/000988, filed Nov. 8, 2013, which claims the priority of Russian patent application 2013111926, filed Mar. 18, 2013, each of which is incorporated herein by reference in its entirety.

FIELD OF THE INVENTION

The present invention relates to technologies for producing rare-earth metal (REM) compounds during complex processing of apatite. In some embodiments, the present disclosure provides methods for concentrating rare-earth metals in phosphogypsum and purification of wet process phosphoric acid from REM.

BACKGROUND OF THE INVENTION

Tens of millions of tons of phosphorus-containing minerals, such as apatite, rock phosphate, etc., are processed for producing phosphorus-containing fertilizers. Typically, the processing is carried out by treating these natural materials with concentrated nitric or sulphuric acid. During the treatment with sulphuric acid, apatite is decomposed with precipitation of calcium sulphate and formation of phosphoric acid solution. In the course of the hemihydrate process, 65%-85% of REM are precipitated with phosphogypsum, and the rest of REM are dissolved in the wet process phosphoric acid. For example, apatite of the Kola Peninsula contains up to 1% of rare-earth metals, 70 to 80% of which are precipitated with calcium sulphate in the course of the hemihydrate processing at apatite with sulphuric acid. All REM which remain in phosphoric acid further goes to fertilizers produced therefrom. Thus, to perform the complete extraction of REM from apatite, it is necessary to recover REM from both phosphogypsum and the acid. It is associated with the complexity of production and increasing the required capital investment. Therefore, it is desirable to concentrate REM in one of these products, either wet process phosphoric acid or phosphogypsum.

A method comprising treatment for 20-25 minutes with 22-30% sulfuric acid solution is carried out to provide extraction of rare earth elements and compounds of phosphorus in solution followed by separation of insoluble residue in the form of gypsum which contains a considerable amount of sulfuric and phosphoric acid is described in RU patent No. 2337897. The extraction solution also contains double sulfates of rare earth metals with sodium or potassium. The resulting crystalline gypsum is treated with $Ca(OH)_2$ or $CaO$ or $CaCO_3$ to neutralize residual sulfuric and phosphoric acid to reach pH>5. The content of phosphorus impurities in the mother liquor shall be monitored. And depending on the ratio of its content and residual humidity gypsum, the mother liquor is directed to the extraction step or subjected to purification treatment by adding $TiOSO_4*H_2O$ to reach an acceptable level of $P_2O_5$. This method allows the recovery of up to 82.1% REM in the extraction solution with subsequent isolation thereof by crystallization in the form of concentrate with a degree of recovery up to 68.5%. The disadvantages of this method include obtaining crystalline gypsum with a pH which does not meet the standard requirements for construction and has a high content of $P_2O_5$. Isolation of the lanthanides from the oversaturated extraction solution requires a significant period of time (2 hours). Monitoring of content of phosphorus impurities in the acid extractant and residual moisture of gypsum precipitate is required. To remove the phosphorus excess, it is necessary to have the equipment to neutralize phosphorus compounds by titanium compounds in a dry form or in a mixture with concentrated sulfuric acid followed by separation of titanyl phosphate and obligatory treatment with concentrated sulphuric acid. If the concentration of sulphuric acid in the extraction solution is reduced to below 22%, an increase of its concentration is necessary in order to reuse it in the process. It requires a large number of reactors, capacitive, filtration and other equipment for extraction of rare earth elements, storage of various extraction solutions and neutralization of phosphorus compounds.

A method of recovering rare-earth elements from phosphogypsum is disclosed in RU patent No. 2293781. The method comprises treatment of phosphogypsum with sulphuric acid solution to recover rare-earth elements into solution, separation of gypsum precipitate, increasing the oversaturation rate of the solution in terms of rare-earth elements to crystalize rare-earth metal concentrate, and separation of the concentrate from mother liquor followed by concentrate processing. Phosphogypsum is treated with 22-30% sulphuric acid solution at liquids-to-solids ratio 1.8-2.2 during 20-30 min to prevent spontaneous crystallization of rare-earth element concentrate in solution before insoluble precipitate is separated. An increase of the oversaturation rate of the solution is achieved by providing sodium concentration 0.4-1.2 g/L. The disadvantage of this method is the use of additional reagents, high acid concentrations and significant amounts thereof, a large number of basic technological operations with incomplete extraction of rare earth elements (up to 71.4%) and the overall complexity of the process.

Concentrating REM from solutions in solid phase is required not only after its recovery from phosphogypsum into the target solution, but also, for example, during REM extraction from wet process phosphoric acid in the course of apatite processing with sulphuric acid. A method for extracting REM from the wet process phosphoric acid and concentrating REM on the solid sorbent using the acid retention method applying the effect of isothermal saturation in adsorbing layers is cited here (Khamizov R. H., Krachak A. N., Gruzdeva A. N., Bolotokov A. A., Khamizov S. H., Smirnov A. A., Zhiguleva T. I. "Sorption concentration and isolation of REM from wet process phosphoric acid". Sorption and chromatography processes (rus), 2012, V. 12, No. 1, pp. 29-39). One of the simplest variants of the acid retention method was used in this work. Repetitive operating cycles are carried out: processed solution is passed upwards through ion-exchange column filled with a dense layer of strong base anion resin, previously equilibrated with the processed solution of the phosphoric acid and then washed out with water, until the acid concentration at the outlet is equal to the concentration of the initial solution and then inverse elution of the acid was carried out with water being passed down. The main effect is that the first passing fractions contain practically no or very little acid (up to pH 2-3). REM salt and some other components poorly soluble in such conditions form a precipitate at the column outlet. Salts soluble in such conditions, for example calcium and manganese compounds, are even concentrated and can be detected in outgoing fractions of solution, corresponding to phosphorus output. Part of REM remained in the solution is also detected in these fractions.

The main disadvantage of this method is its relatively low productivity limited by capacity of the ion-exchange resins and, therefore, high price thereof.

SUMMARY

Embodiments of the present disclosure provide for methods of concentrating rare-earth metals (REM) in phosphogypsum. Methods may comprise a process of decomposition of the REM containing raw phosphate material with sulphuric acid. A sodium salt in the amount of 0.25 kg to 5.0 kg in terms of $Na_2O$ or a potassium salts in the amount of 0.25 kg to 5.0 kg in terms of $K_2O$ or a mixture thereof in the amount of 0.25 kg to 5 kg in terms of $Na_2O$ and $K_2O$ to 1 kg of REM (in terms of $Ln_2O_3$ present in raw phosphate material) may be added. In some embodiments, sulphate, chloride or nitrate of sodium or potassium or a mixture thereof may be used as the sodium and/or potassium salt.

DETAILED DISCLOSURE

The present invention addresses the problem of concentrating REM in phosphogypsum in the course of processing apatite with sulphuric acid and removing REM from wet process phosphoric acid. In the present invention, the term "REM" is used to indicate lanthanides and yttrium. Also, the symbol "Ln" is used for these elements.

Embodiments of the present disclosure may address the aforementioned problems by adding a sodium salt in the amount of 0.25-5.0 kg in terms of $Na_2O$ or a potassium salts in the amount of 0.25-5.0 kg in terms of $K_2O$ or a mixture thereof in the amount of 0.25-5 kg in terms of $Na_2O$ and $K_2O$ to 1 kg of REM (in terms of $Ln_2O_3$ present in raw phosphate material) to a process of decomposition of the REM containing raw phosphate material with sulphuric acid. The technical effect is an increase in the degree of transfer of REM into phosphogypsum up to 98%.

The present invention is explained in more detail below.

According to embodiments of the disclosure REM in the phosphogypsum hemihydrate is present predominantly in the form of compounds $MLn(SO_4)_2$ (wherein M is alkali metal atom, Na or K), forming a solid solution with the main phase of calcium sulfate.

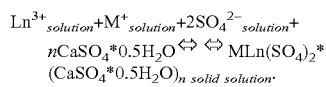

Thus, adding sodium or potassium salts to apatite shifts the equilibrium towards the formation of the solid solution of REM within calcium sulfate hemihydrate.

Sulphates, chlorides, nitrates of sodium or potassium or mixtures thereof can be used. Use of sodium or potassium sulphates is preferable.

It is also well-known that the solubility of double sulphates $MLn(SO4)_2$ is much lower than solubility of sulfate $Ln_2(SO_4)_3$. Thus, the addition of sodium or potassium salts to apatite reduces the solubility of REM in the wet process phosphoric acid and promotes their precipitation in the form of a separate phase.

The present invention is explained in more detail below using Figures and exemplary embodiments, serving solely for illustrative purposes and not intended to limit the scope of the present invention defined by the appended claims.

Example 1. Apatite Processing without the Addition of Alkali Metals 100 g of apatite concentrate was mixed with 97 g of 93% $H_2SO_4$ and 295 g of phosphoric acid having 30% $P_2O_5$. The obtained slurry was stirred for 180 min at 90-100° C. and filtered. The obtained precipitate of phosphogypsum hemihydrate ($CaSO_4*0.5H_2O$) was washed. Thus, a precipitate containing 0.535% $Ln_2O_3$ and phosphoric acid having 36% $P_2O_5$ and 0.035% $Ln_2O_3$ were obtained.

Example 2. Apatite Processing with Addition of Alkali Metal 100 g of apatite concentrate was mixed with 97 g of 93% $H_2SO_4$, 295 g of phosphoric acid having 30% $P_2O_5$ and 0.6 g of $Na_2SO_4$. The obtained slurry was stirred for 180 min at 90-100° C. and filtered. The obtained precipitate of phosphogypsum hemihydrate ($CaSO_4*0.5H_2O$) was washed. Thus, a precipitate containing 0.61% $Ln_2O_3$ and phosphoric acid having 36% $P_2O_5$ and 0.021% $Ln_2O_3$ were obtained.

Example 3. Apatite Processing with the Addition of Alkali Metal 100 g of apatite concentrate was mixed with 97 g of 93% $H_2SO_4$, 295 g of phosphoric acid having 30% $P_2O_5$ and 6.0 g of $Na_2SO_4$. The obtained slurry was stirred for 180 min at 90-100° C. and filtered. The obtained precipitate of phosphogypsum hemihydrate ($CaSO_4*0.5H_2O$) was washed. Thus, a precipitate containing 0.645% $Ln_2O_3$ and phosphoric acid having 36% $P_2O_5$ and 0.009% $Ln_2O_3$ were obtained.

Example 4. Apatite Processing with the Addition of Alkali Metal 100 g of apatite concentrate was mixed with 97 g of 93% $H_2SO_4$, 295 g of phosphoric acid having 30% $P_2O_5$ and 10.0 g of $K_2SO_4$. The obtained slurry was stirred for 180 min at 90-100° C. and filtered. The obtained precipitate of phosphogypsum hemihydrate ($CaSO_4*0.5H_2O$) was washed. Thus, a precipitate containing 0.65% $Ln_2O_3$ and phosphoric acid having 36% $P_2O_5$ and 0.01% $Ln_2O_3$ were obtained.

While the present invention is described in detail above, one skilled in the art will recognize that modifications and equivalent substitutions can be made, and such modifications and substitutions are within the scope of the present invention defined by the appended claims.

What is claimed:

1. A method for decomposition of a rare-earth metals (REM) containing raw phosphate material with sulphuric acid:
    wherein decomposition of the REM containing raw phosphate material is carried out by addition of sulphuric acid together with a sodium salt in the amount of about 0.25 kg to about 5.0 kg in terms of $Na_2O$ or a potassium salt in the amount of about 0.25 kg to about 5.0 kg in terms of $K_2O$ or a mixture thereof in the amount of about 0.25 kg to about 5 kg in terms of $Na_2O$ and $K_2O$ to about 1 kg of REM in terms of $Ln_2O_3$ present in the raw phosphate material, the decomposition leads to concentrating REM in the resulted phosphogypsum.

2. The method of claim 1, wherein sulphate, chloride or nitrate of sodium or potassium or a mixture thereof is used as the sodium and/or potassium salt.

* * * * *